United States Patent [19]

Hagiwara et al.

[11] 4,095,831
[45] Jun. 20, 1978

[54] VEHICLE BUMPER DEVICE

[75] Inventors: Taro Hagiwara; Shojiro Seki, both of Yokohama, Japan

[73] Assignee: Nissan Motor Company, Limited, Japan

[21] Appl. No.: 746,791

[22] Filed: Dec. 2, 1976

[30] Foreign Application Priority Data

Dec. 9, 1975 Japan .................... 50-165246

[51] Int. Cl.² ............................................ B60R 19/06
[52] U.S. Cl. ........................................ 293/62; 293/96
[58] Field of Search ............... 293/62, 69 R, 83, 85, 293/96, 99, 75, 87, 88

[56] References Cited

U.S. PATENT DOCUMENTS

| 2,171,104 | 8/1939 | Walter | 293/62 |
| 2,187,952 | 1/1940 | Rusche | 293/62 |
| 3,540,768 | 11/1970 | Peters | 293/62 |
| 3,656,792 | 4/1972 | Tavano | 293/88 |

FOREIGN PATENT DOCUMENTS 2,361,213  6/1975  Germany ................ 293/96

Primary Examiner—Trygve M. Blix
Assistant Examiner—D. W. Keen

[57] ABSTRACT

Vehicle bumper device comprises an impact receiving member at a location distant from the longitudinal end of a vehicle body and two side bumpers fixed at their forward ends to the impact receiving member. At its rearward end each of the side bumpers is detachably attached to the vehicle body to prevent vibration of the side bumper. Upon frontal impact of the vehicle the side bumpers will be readily detached from the vehicle body without deforming of the vehicle body.

2 Claims, 5 Drawing Figures

VEHICLE BUMPER DEVICE

The present invention relates to a vehicle bumper device and more particularly to means for preventing vibration of bumper sides of the bumper device.

When installing the side bumpers to a bumper or an impact receiving member, there are a few known ways as follows:

Firstly, if it is relatively short, a bumper side is fixed to an impact receiving member at its forward end, while making its rearward end free.

Secondly, if it is relatively long, a side bumper is attached to a vehicle body panel, while its forward end is disconnected from an impact receiving member.

Thirdly, if it is relatively long, a side bumper is fixed at its forward end to an impact receiving member and its rearward end is attached to a vehicle body panel and the side bumper is made collapsible at its intermediate portion between the forward and rearward ends.

The problem with the third way above is that it is difficult to manufacture a bumper side with a collapsible structure which is effectively collapsible upon impact.

The problem with the second way above is that it is difficult to align a side bumper's forward end with an impact receiving member during their assembly.

The problem with the first way above is that the free rearward end of a side bumper may vibrate during operation of the vehicle.

When the forward end of a side bumper is fixed to an impact receiving member supported by the vehicle frame through a shock absorber and its rearward end is attached to the vehicle body panel, moving of the side bumper upon movement of the impact receiving member under frontal impact of the vehicle will deform the vehicle body. This is also a problem.

The present invention contemplates to solve the above problems encountered in the prior art.

It is therefore an object of the present invention to provide a vehicle bumper device in which each of the side bumpers is installed so that it will not vibrate during operation of an automobile and it will detach from the vehicle body without deforming the vehicle body upon impact of the automobile.

It is another object of the present invention to provide a vehicle bumper device in which each of side bumpers is detachably attached to the vehicle body.

The present invention will be specifically described hereinafter in connection with the accompanying drawings, in which.

Figure 1:
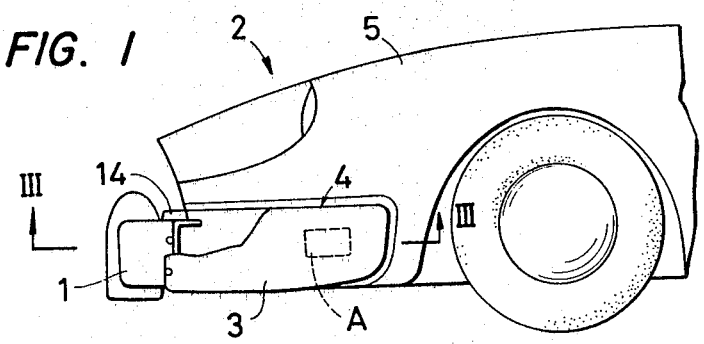
FIG. 1 is a side view of a frontal end portion of an automobile.

Referring now to FIG. 1, there is shown a front portion of an automobile in which a bumper or an impact receiving member 1 is disposed at a location distant from the front end of a vehicle body 2. The impact receiving member 1 is supported by a vehicle frame, not shown, in a shock absorbing manner, that is, upon frontal impact of the automobile, the impact receiving member moves relative to the vehicle body to absorb the impact. The bumper devices of the type above are well known in the art and any one of them may be employed in this embodiment. For this reason precise explanation of how the impact receiving member 1 is supported by the vehicle frame is omitted for the sake of brevity of description.

Connected respectively to the both ends of the impact receiving member 1 are two side bumpers 3. Each of the side bumpers 3 is connected at its forward end to the impact receiving member 1. The forward end of the side bumper 3 is connected to the impact receiving member 1 in such a well known manner that at the joint between the impact receiving member 1 and the side bumper 3, vibration noise will not occur.

The vehicle body 2 is formed with a recessed portion 4 adapted to receive the side bumper 3. The rearward end of the side bumper 3 is held in the proper position within the recessed portion 4 by means of an apparatus A to prevent vibration of the side bumper 3 during operation of the automobile. The apparatus A is constructed of a male piece 6 and a female piece 7 to be coupled with the male piece 6 (see FIG. 2).

Figure 2:
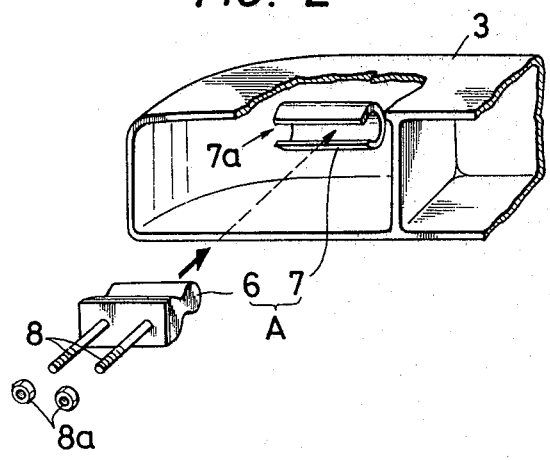
FIG. 2 is an exploded view of a side bumper and an apparatus to detachably attach the side bumper to vehicle body in such a manner to prevent vibration of the side bumper.

As best seen in FIG. 2, the male piece 6 can be coupled with the female piece 7 by inserting (in the direction of an arrow) into the female piece 7 through a slot 7a. The female piece 7 is made of a springy material so that the slot 7a will be widened upon inserting of the male piece 6 and will be narrowed after completing of the insertion. Uncoupling or detaching of the male piece 6 from the female piece 7 can be made by pulling the male piece 6 from the female piece 7 in a direction opposite to the direction of the arrow.

The male piece 6 is fixed to the recessed portion 4 of the vehicle body 2 by two tapped plungers 8 and nuts 8a, while the female piece 7 is fixed to the interior wall of the side bumper 3 by any suitable measure, such as spot welding or bolts.

Preferably, the slot 7a extends in such a direction along which the side bumper 3 will move with respect to the vehicle body 2 upon movement of the impact receiving member 1 in a longitudinal direction of the vehicle body 2 in order to allow the side bumper 3 to move rearwardly of the vehicle body 2.

Figure 3:
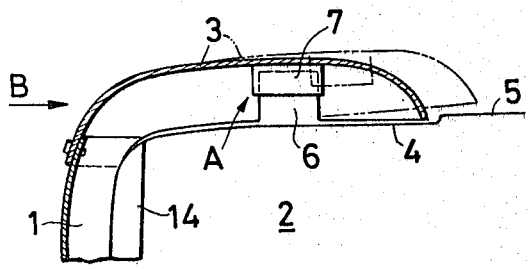
FIG. 3 is a section through line III—III shown in FIG. 1.

As best seen in FIG. 3, an elastomeric form retaining apron 14 bridges the space between the impact receiving member 1 and an adjacent portion of the vehicle body 2. This apron 14 can flex considerably and will function as a visual shield.

The operation of the bumper device described above will now be explained.

When the impact receiving member 1 moves under frontal impact of the automobile to absorb the impact, the side bumper 3 will receive a force tending to move it in the direction of an arrow B. Under this condition, the side bumper 3 is allowed to move or slide rearwardly of the vehicle body with the female piece 7 remaining coupled with the male piece 6 because the female piece 7 can move along the slot 7a. When the force tending to move the side bumper 3 is great, the side bumper will readily be detached from the recessed portion 4 of the vehicle body 2 because the female piece 7 will be uncoupled from the male piece 6 under the application of a force tending to move the side bumper 3 away from the recessed portion 4.

It will now be appreciated that since an amount of force transmitted to the vehicle body 2 upon detaching of the side bumper 3 from the recessed portion 4 is equal to that of a force required to uncouple the female piece 7 from the male piece 6 and the amount of force is not great enough to deform the vehicle body 2, the vehicle body 2 will be protected from being damaged upon movement of the side bumper with respect to the recessed portion and subsequent detaching of the side bumper from the recessed portion.

Of course, the male piece 6 and the female piece 7 must be coupled with such a strong holding force as to prevent vibration of the side bumper 3 during operation of the automobile.

The fact that the male and female pieces 6 and 7 can be readily uncoupled to allow detaching of the side bumper 3 from the recessed portion 4 makes it possible to attach again the side bumper 3 in the proper position within the recessed portion 4 after detaching of the side bumper 3 from the recessed portion 4 as a result of the rearward movement of the impact receiving member 1 under the frontal impact of the automobile.

Figure 4A:
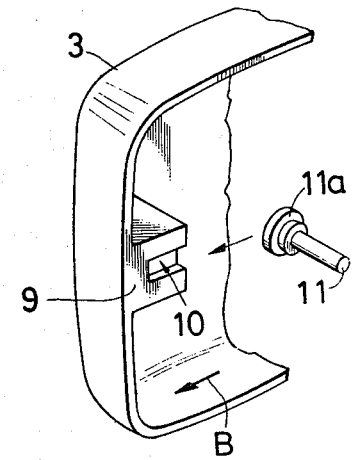
FIG. 4a shows a modification of the apparatus shown in FIG. 2.
Figure 4B:
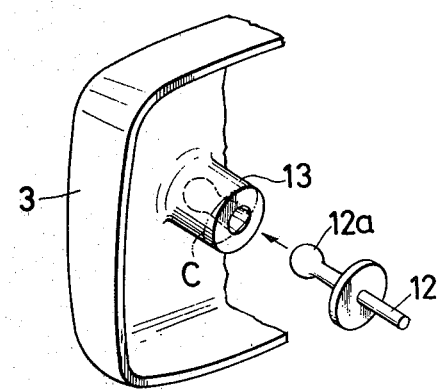
FIG. 4b shows still another modification of the apparatus shown in FIG. 2.

The apparatus A may be formed as shown in FIG. 4a or FIG. 4b.

Referring to FIG. 4a, a side bumper 3 has a female piece of the form of a thick portion 9 at the rearward end thereof and a key groove 10 is formed at the thick portion 9. The key groove 10 is adapted to receive a head 11a of a male piece 11 which is rigidly secured to a recessed portion of a vehicle body 2. The key groove 10 is open toward a direction opposite to a direction of an arrow B.

Referring to FIG. 4b, a side bumper 3 has a female piece 13 rigidly secured thereto. The female piece 13 is made of an elastic material and has a hole to receive a spherical head 12a of a male piece 12 which is rigidly secured to a recessed portion 4 of a vehicle body 2 (see FIG. 1). In the embodiment shown in FIG. 4b, even though the top surface of the female piece 13 is flat and is within a plane substantially perpendicular to a transverse direction of the automobile, the top face may be cut as inclined as shown in imaginary line C so as to reduce a resistance to moving of the side bumper 3 when subjected to a force tending to move it rearwardly.

The side bumper vibration preventing apparatuses as shown in FIGS. 4a and 4b have similar function to that shown in FIGS. 1-3.

According to the present invention, since the side bumpers 3 are at their forward ends fixed to an impact receiving member 1 and at their rearward ends detachably attached to the vehicle body 2 by means of apparatuses A constructed of a male piece and a female piece, the side bumpers 3 will be readily detached from the vehicle body 2 without deforming of vehicle body 2 when they are subjected to force tending to move them rearwardly upon frontal impact. Moreover, the side bumper 3 can be easily attached to the vehicle body in the initial proper position. Detachably attaching the rearward end of the side bumper 3 to the vehicle body 2 prevents the rearward end of the side bumper from dropping so that a relatively long side bumper may be employed.

Since the side bumpers are formed from a resilient synthetic plastics material such as by moulding, there were considerable variations in width of space between each side bumper and the vehicle body in the prior art bumper devices employing side bumpers. The variations in width of space between each side bumper and the vehicle body is negligible in the bumper device according to the present invention because the rearward end of each side bumper is attached to the vehicle body to hold the width of the space constant. Thus, as compared to the bumper devices of the prior art, the bumper device of the present invention is beautiful.

What is claimed is:

1. In a vehicle having a vehicle body and an impact receiving bar spaced at a distance from a longitudinal end of the vehicle body, the improvement comprising:
   a side bumper spaced at a distance from a lateral side of the vehicle body and having one end fixed to one end of the impact receiving bar;
   a male piece secured to one of said lateral side of the vehicle body and an opposite end of said side bumper; and
   a female piece secured to the other one of said lateral side of the vehicle body and an opposite end of said side bumper;
   said male piece having an enlarged portion adapted for engaging in said female piece, said male piece being made of a rigid material,
   said female piece being made of a springy material and having a slot, said female piece detachably receiving said enlarged portion of said male piece upon pressing, in assembly, said side member towards said lateral side of the vehicle body with said enlarged portion of said male piece aligned with said slot, said slot of said female piece extending in a direction to allow said male piece to disengage from said female piece when said side bumper moves along the longitudinal direction of the vehicle body.

2. In a vehicle having a vehicle body and an impact receiving bar spaced at a distance from a longitudinal end of the vehicle body, the improvement comprising:
   a side bumper spaced at a distance from a lateral side of the vehicle body and having one end fixed to one end of the impact receiving bar;
   a male piece secured to one of said lateral side of the vehicle body and an opposite end of said side bumper; and
   a female piece secured to the other one of said lateral side of the vehicle body and an opposite end of said side bumper;
   said male piece having an enlarged portion adapted for engaging in said female piece, said male piece being made of a rigid material;
   said female piece having a key groove to receive said enlarged portion, said female piece constructed to allow said male piece to disengage from said female piece when said side bumper moves along the longitudinal direction of the vehicle body.

* * * * *